(12) United States Patent
Sims

(10) Patent No.: US 7,373,035 B2
(45) Date of Patent: May 13, 2008

(54) HEAT TRANSFER STRUCTURES

(75) Inventor: Tyler Sims, Knoxville, TN (US)

(73) Assignee: Avago Technologies Fiber IP Pte Ltd, Singapore (SG)

(*) Notice: Subject to any disclaimer, the term of this patent is extended or adjusted under 35 U.S.C. 154(b) by 0 days.

(21) Appl. No.: 11/357,684

(22) Filed: Feb. 17, 2006

(65) Prior Publication Data

US 2006/0257069 A1    Nov. 16, 2006

Related U.S. Application Data

(62) Division of application No. 10/702,015, filed on Nov. 5, 2003, now Pat. No. 7,031,564.

(51) Int. Cl.
*G02B 6/12* (2006.01)
*G02B 6/02* (2006.01)

(52) U.S. Cl. .............................. 385/16; 385/17; 385/50

(58) Field of Classification Search .................. 385/16, 385/27, 9, 41, 50, 52, 17
See application file for complete search history.

(56) References Cited

U.S. PATENT DOCUMENTS

| | | | |
|---|---|---|---|
| 5,699,462 A * | 12/1997 | Fouquet et al. ............. 385/18 |
| 6,195,478 B1 | 2/2001 | Fouquet et al. | |
| 6,320,994 B1 | 11/2001 | Donald et al. | |
| 6,324,316 B1 * | 11/2001 | Fouquet et al. ............. 385/16 |
| 6,487,333 B2 * | 11/2002 | Fouquet et al. ............. 385/18 |
| 2003/0049384 A1 * | 3/2003 | Liu et al. .................. 427/427 |
| 2003/0119289 A1 * | 6/2003 | Bryant ...................... 438/589 |
| 2003/0190608 A1 * | 10/2003 | Blackburn ..................... 435/6 |
| 2004/0029305 A1 * | 2/2004 | Chung et al. ................ 438/27 |
| 2004/0071595 A1 * | 4/2004 | Neeper et al. ............... 422/72 |
| 2004/0124846 A1 * | 7/2004 | Yamashita et al. .......... 324/537 |
| 2005/0024433 A1 * | 2/2005 | Cruz-Uribe et al. .......... 347/50 |

* cited by examiner

*Primary Examiner*—K. Cyrus Kianni

(57) ABSTRACT

A switching element includes a bubble chamber, a heater and a heat conductor. The bubble chamber holds fluid. The bubble chamber includes a trench within a planar light circuit and includes a trench within an integrated circuit attached to the planar light circuit. The heater is located under the trench within the integrated circuit. The heat conductor is attached to the integrated circuit. The heat conductor is located within the trench within the integrated circuit. A portion of the heat conductor is in close proximity to the heater. The heat conductor is more heat conductive than the fluid within the bubble chamber.

15 Claims, 5 Drawing Sheets

HEAT TRANSFER STRUCTURES

CROSS REFERENCE TO RELATED APPLICATION

This is a Divisional of application Ser. No. 10/702,015 filed on Nov. 5, 2003 now U.S. Pat. No. 7,031,564, the entire disclosure of which is incorporated herein by reference.

BACKGROUND

The present invention relates to components useful in optical switching devices and pertains particularly to heat transfer structures.

Optical fibers provide significantly higher data rates than electronic paths. However, effective utilization of the greater bandwidth inherent in optical signal paths requires optical cross-connect switches.

One type of optical cross-connect switch utilizes total internal reflection (TIR) switching elements. A TIR element consists of a waveguide with a switchable boundary. Light strikes the boundary at an angle. In the first state, the boundary separates two regions having substantially different indices of refraction. In this state the light is reflected off of the boundary and thus changes direction. In the second state, the two regions separated by the boundary have the same index of refraction and the light continues in a straight line through the boundary. The magnitude of the change of direction depends on the difference in the index of refraction of the two regions. To obtain a large change in direction, the region behind the boundary must be switchable between an index of refraction equal to that of the waveguide and an index of refraction that differs markedly from that of the waveguide.

One type of TIR element is taught in U.S. Pat. No. 5,699,462 which is hereby incorporated by reference. The TIR element taught in this patent utilizes thermal activation to displace liquid from a gap at the intersection of a first optical waveguide and a second optical waveguide. In this type of TIR, a trench is cut through a waveguide. The trench is filled with an index-matching liquid. A bubble is generated at the cross-point by heating the index matching liquid with a localized heater. The bubble must be removed from the crosspoint to switch the cross-point from the reflecting to the transmitting state and thus change the direction of the output optical signal. Efficient operation of such a TIR element requires effective placement and operation of heating devices within and around the TIR elements.

SUMMARY OF THE INVENTION

A switching element includes a bubble chamber, a heater and a heat conductor. The bubble chamber holds fluid. The bubble chamber includes a trench within a planar light circuit and includes a trench within an integrated circuit attached to the planar light circuit. The heater is located under the trench within the integrated circuit. The heat conductor is attached to the integrated circuit. The heat conductor is located within the trench within the integrated circuit. A portion of the heat conductor is in close proximity to the heater. The heat conductor is more heat conductive than the fluid within the bubble chamber.

DESCRIPTION OF THE PREFERRED EMBODIMENT

Figure 1:
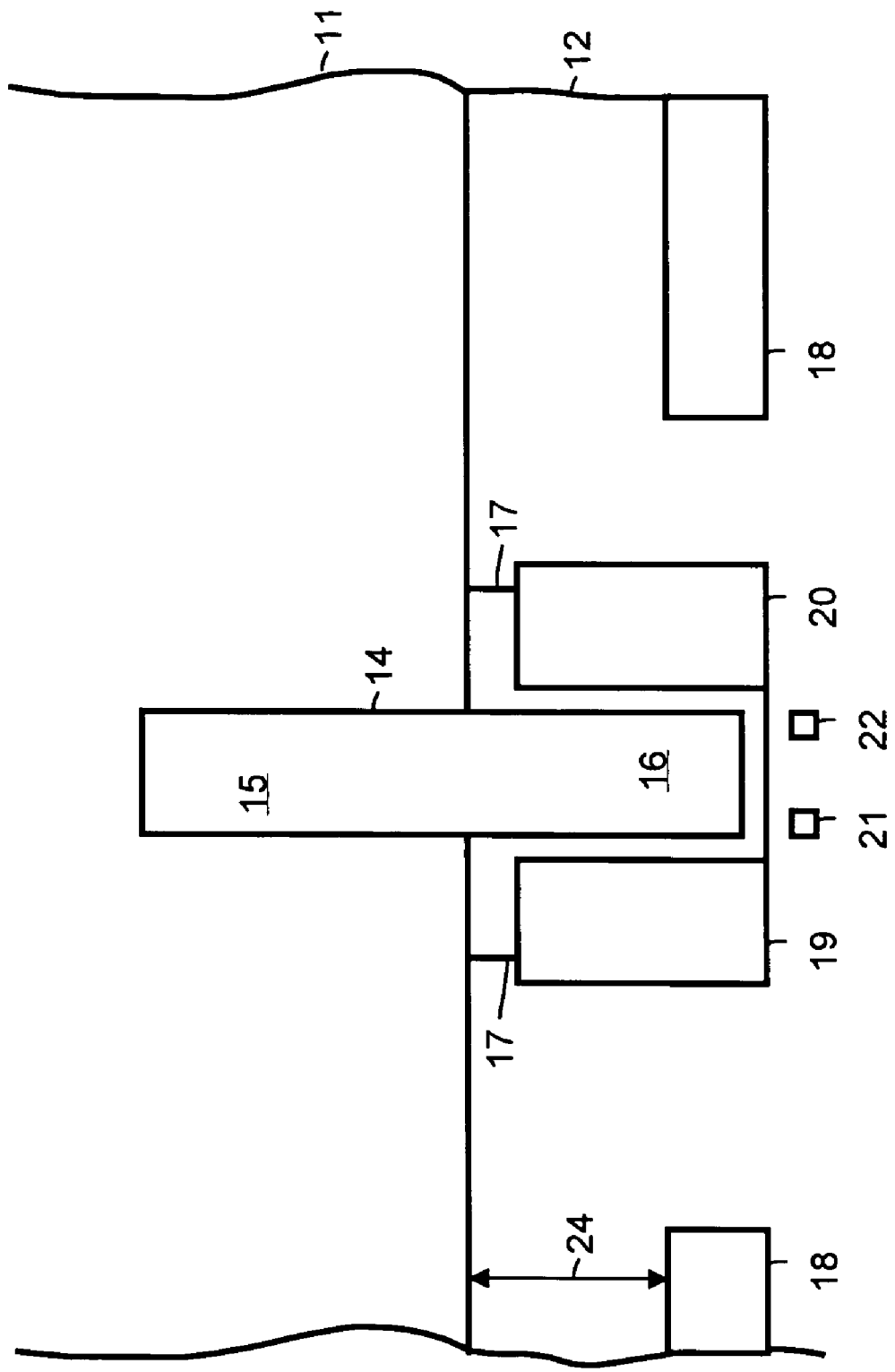
FIG. 1 shows a cross section of a bubble chamber area of a total internal reflection switching element in accordance with an embodiment of the present invention.

FIG. 1 shows a cross section of an area of a total internal switching element that includes a bubble chamber 14. Bubble chamber 14 includes a trench 15 within a planar light circuit (PLC) 11. Planar light circuit 11 includes waveguides that are switched at trench areas. Each trench is filled with an index-matching liquid (fluid). A bubble is generated at the cross-point by heating the index matching liquid with a localized heater. The bubble must be removed from the cross-point to switch the cross-point from the reflecting to the transmitting state and thus change the direction of the output optical signal.

An integrated circuit 12 is attached to PLC 11, for example by wafer bonding or soldering. Within integrated circuit 12, trench 16 is aligned with trench 15 to fully form bubble chamber 14. A single resistor with more than one leg (unshaped) or a resistor 21 and a resistor 22 are the localized heater used to generate bubbles within bubble chamber 14. A pillar 19 and a pillar 20 are coated with heat conductor 17 in order to conduct heat from resistor 21 and resistor 22 within walls of trench 16. For example, pillars 19 and pillar 20 are composed of oxide. Heat conductor 17 is composed of, for example, tantalum, tungsten, aluminum, silicon or another heat conducting material or stack of heat conducting material. Resistor 21 and resistor 22 are composed of Tantalum Aluminum (TaAl) or some other resistive material.

Sections 18 are part of a third metal layer on integrated circuit 12. An arrow 24 represents a solder gap height for solder used to attach integrated circuit 12 to PLC 11. For example, the solder gap is five to seven microns.

In order to form pillar 19 and pillar 20, an oxide layer is formed on top of integrated circuit 12. For example, this is done by a Teos process or by a spin on glass process. A patterned etch is performed down to the oxide immediately over resistor 21 and resistor 22. Heat conductor 17 is formed within the resulting trench. This is done, for example, by depositing heat conductive material and then removing the heat conductive material everywhere except for the desired locations of heat conductor 17.

The oxide layer formed on top of integrated circuit 12 is also removed at locations where it is desired to have a gap between PLC 11 and integrated circuit 12 in order to store and/or transport fluid for use within total internal switching elements.

Heat conductor 17 is used to radiate heat from resistors 21 and 22. This is used, for example to warm walls of trench 16. This results in a larger operating range and more stable bubbles since surface tension effect to imperfections in local gaps are reduced or removed. The viscosity, density and surface tension of the fluid within bubble chamber 14 change with heat. The heat is used to maintain the liquid near the reflecting wall above the evaporation point for a large range of applied power. The physical structures are used to create varied thermal maps and increased local pressure and recondense liquid. The physical heated bubble chamber can also be used to control flow fields to prevent impurities within the fluid from being drawn in and deposited onto resistors either by physical absorption or by chemical reaction.

Oxide pillars 19 and 20 also act as barriers for thermal and fluidic cross talk. The use of heat conductor 17 and pillars 19 and 20 reduce the need for metal or solder film designs that are sensitive to chemical and thermal ranges.

The shape and location of the heat conductors depend on the specific application. The heat conductors are more heat conductive than fluid used in the bubble chambers. The best heat conductors are orders of magnitude more heat conductive than fluid used in the bubble chambers.

Figure 2:
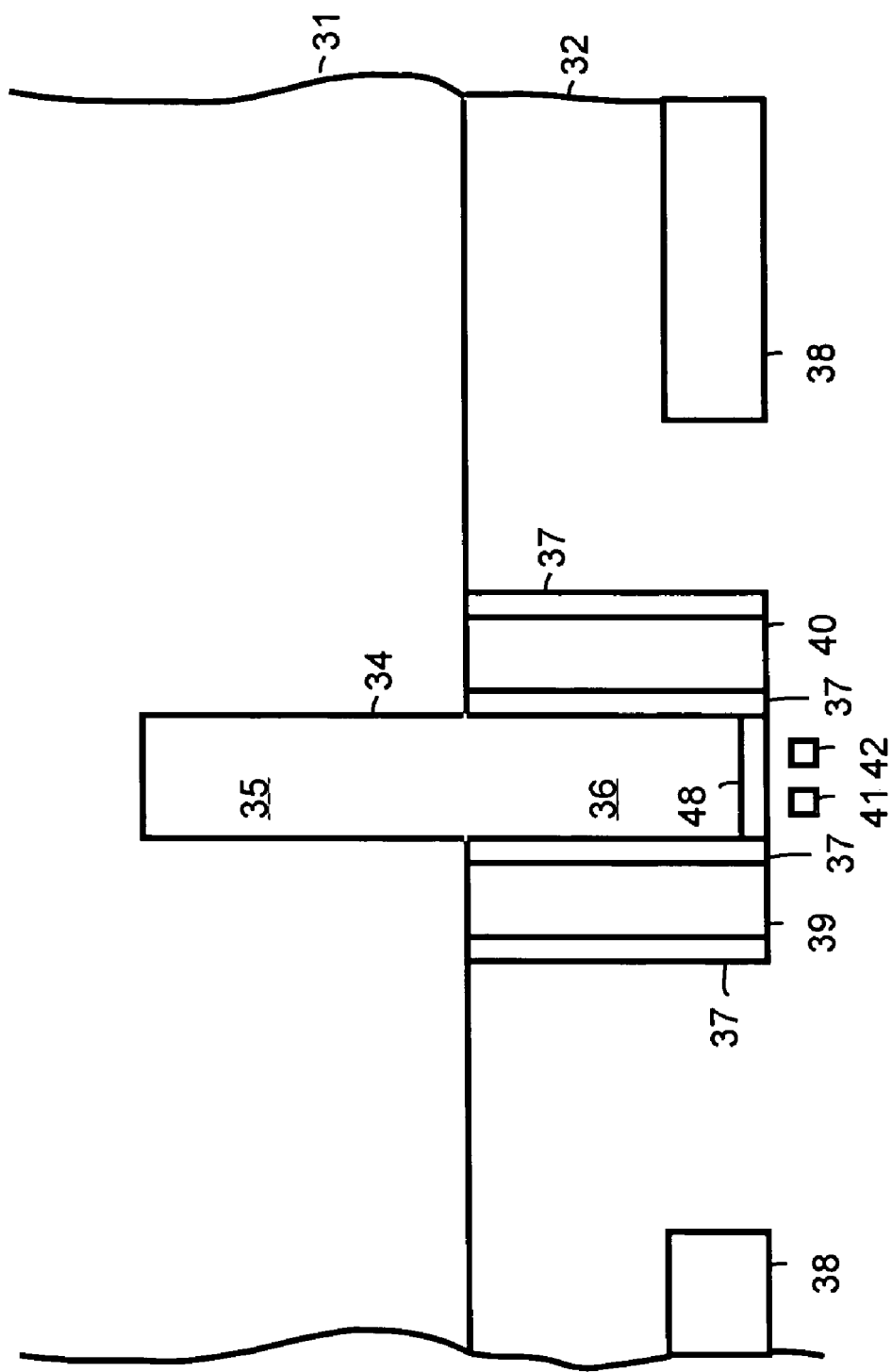
FIG. 2 shows a cross section of a bubble chamber area of a total internal reflection switching element in accordance with another embodiment of the present invention.

FIG. 2 shows another example of a cross section of an area of a total internal switching element that includes a bubble chamber 34. Bubble chamber 34 includes a trench 35 within a planar light circuit (PLC) 31. Planar light circuit 31 includes waveguides that are switched at trench areas. Each trench is filled with an index-matching liquid (fluid). A bubble is generated at the cross-point by heating the index matching liquid with a localized heater. The bubble must be removed from the cross-point to switch the cross-point from the reflecting to the transmitting state and thus change the direction of the output optical signal.

An integrated circuit 32 is attached to PLC 31, for example, by wafer bonding or soldering. Within integrated circuit 32, trench 36 is aligned with trench 35 to fully form bubble chamber 34. A resistor 41 and a resistor 42 are the localized heater used to generate bubbles within bubble chamber 34. A pillar 39 and a pillar 40 are used to fill in a material 37 as shown. Pillar 39 and pillar 40 are used to conduct heat from resistor 41 and resistor 42 within walls of trench 36. For example, pillars 39 and pillar 40 are composed of tantalum, tungsten, aluminum, silicon or another heat conducting material or stack of heat conducting material. Material 37 is composed of, for example, oxide. Resistor 41 and resistor 42 are composed of Tantalum Aluminum (TaAl) or some other resistive material. Sections 38 are part of a third metal layer on integrated circuit 32.

In order to form pillar 39 and pillar 40, an oxide layer is formed on top of integrated circuit 32. For example, this is done by a Teos process or by a spin on glass process. A patterned etch is performed down to the oxide immediately over the locations of pillar 39 and pillar 40. Pillar 39, pillar 40 and bottom area 48 are formed of heat conducting material. A chemical mechanical polish (CMP) process is used to reduce pillar 39 and pillar 40 to a desired height. The oxide layer formed on top of integrated circuit 32 is also removed at locations over resistor 41 and resistor 42 and where it is desired to have a gap between PLC 31 and integrated circuit 32 in order to store and/or transport fluid for use within total internal switching elements and to allow electrical interconnect. Material 37 remains.

Pillar 39 and pillar 40 are used to radiate heat from resistors 41 and 42. This is used, for example to warm walls of trench 36. This results in a larger operating range and more stable bubbles since surface tension effect to imperfections in local gaps are reduced or removed. Material 37 acts to insulate and protect pillar 39 and pillar 40. The use of material 37 and pillars 39 and 40 reduce the need for metal or solder film designs that are sensitive to chemical and thermal ranges.

Figure 3:
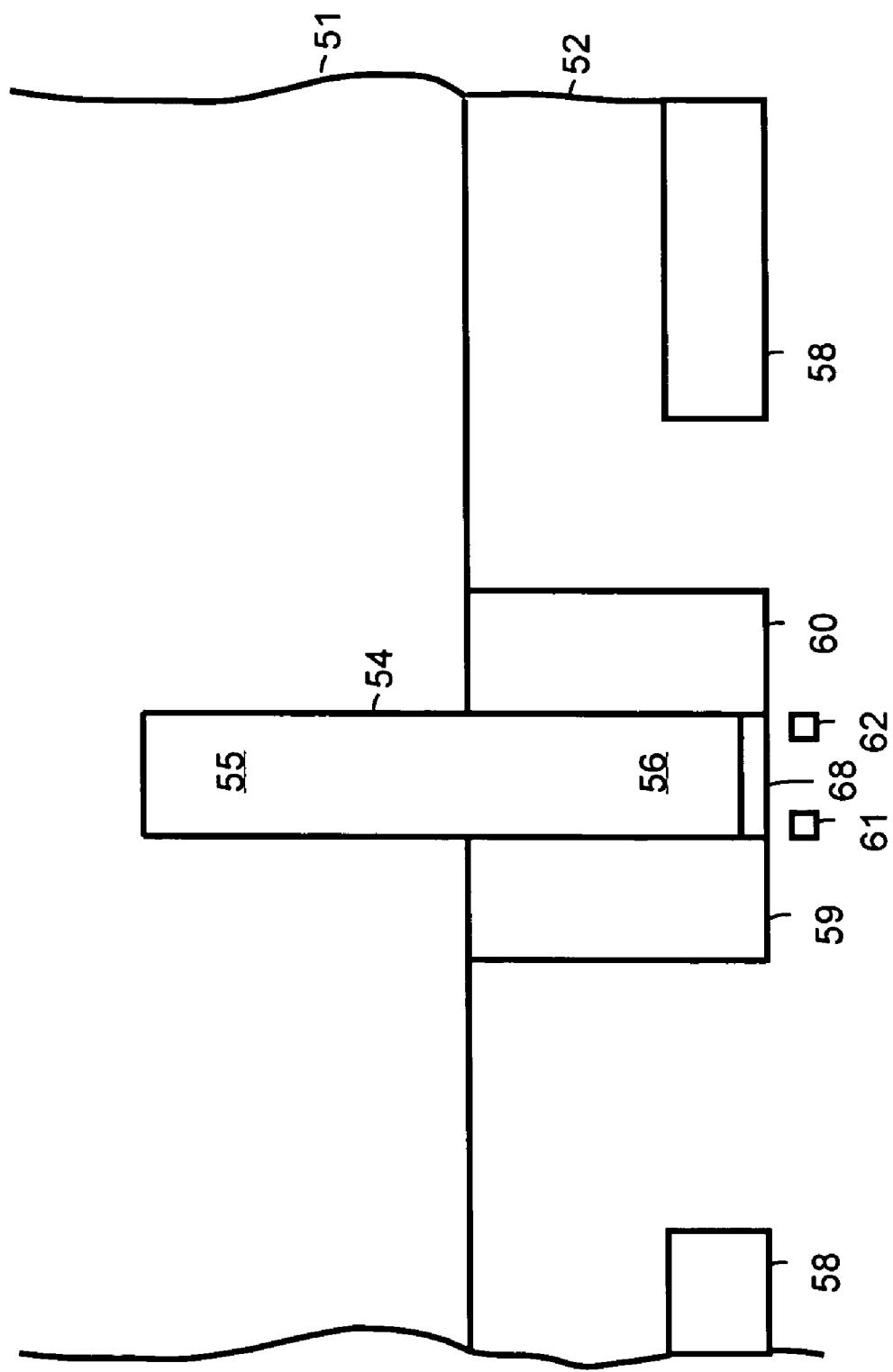
FIG. 3 shows a cross section of a bubble chamber area of a total internal reflection switching element in accordance with another embodiment of the present invention.

FIG. 3 shows another example of a cross section of an area of a total internal switching element that includes a bubble chamber 54. Bubble chamber 54 includes a trench 55 within a planar light circuit (PLC) 51. Planar light circuit 51 includes waveguides that are switched at trench areas. Each trench is filled with an index-matching liquid (fluid). A bubble is generated at the cross-point by heating the index matching liquid with a localized heater. The bubble must be removed from the cross-point to switch the cross-point from the reflecting to the transmitting state and thus change the direction of the output optical signal.

An integrated circuit 52 is attached to PLC 51, for example by wafer bonding or soldering. Within integrated circuit 52, trench 56 is aligned with trench 55 to fully form bubble chamber 54. A resistor 61 and a resistor 62 are the localized heater used to generate bubbles within bubble chamber 54. A pillar 59 and a pillar 60 are used to conduct heat from resistor 61 and resistor 62 within walls of trench 56. For example, pillars 59 and pillar 60 are composed of single crystal silicon or SiC, or a liquid settable ceramic such as Ceraset or Lanxide liquid settable ceramics available from KiON Corporation. A bottom area 68 is formed of heat conducting material. Resistor 61 and resistor 62 are composed of Tantalum Aluminum (TaAl) or some other resistive material. Sections 58 are part of a third metal layer on integrated circuit 52.

Pillar 59 and pillar 60 can be attached to PLC 12 via micro molding. Pillar 59 and pillar 60 are used to radiate heat from resistors 61 and 62. This is used, for example to warm walls of trench 56. This results in a larger operating range and more stable bubbles since surface tension effect to imperfections in local gaps are reduced or removed.

Figure 4:
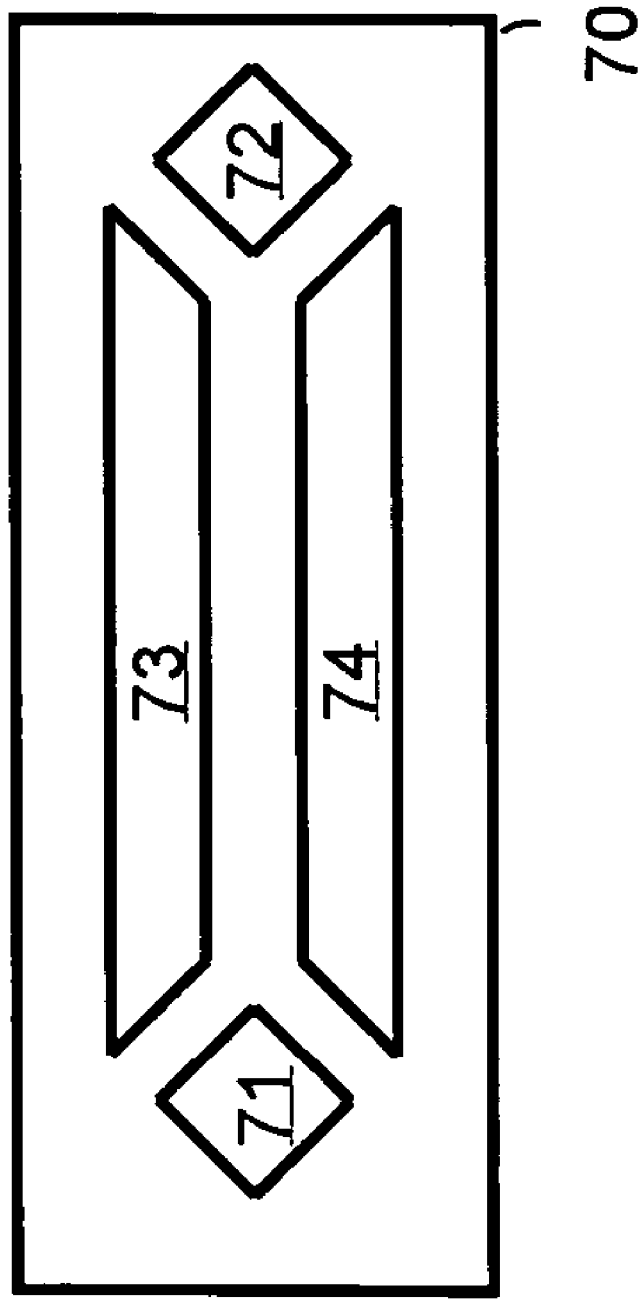
FIG. 4 shows a top view of pillars within a bubble chamber of a total internal reflection switching element in accordance with an embodiment of the present invention.

Dependent on a particular application, pillars can be shaped and arranged in a variety of ways to form a heat conductor. For example, FIG. 4 shows a top view of one arrangement where a pillar 71, a pillar 72, a pillar 73 and a pillar 74 reside on an oxide region 70 of an integrated circuit. Pillar 71 and pillar 72 are end pillars that can optionally be added to increase fluidic impedance and surface tension.

Figure 5:
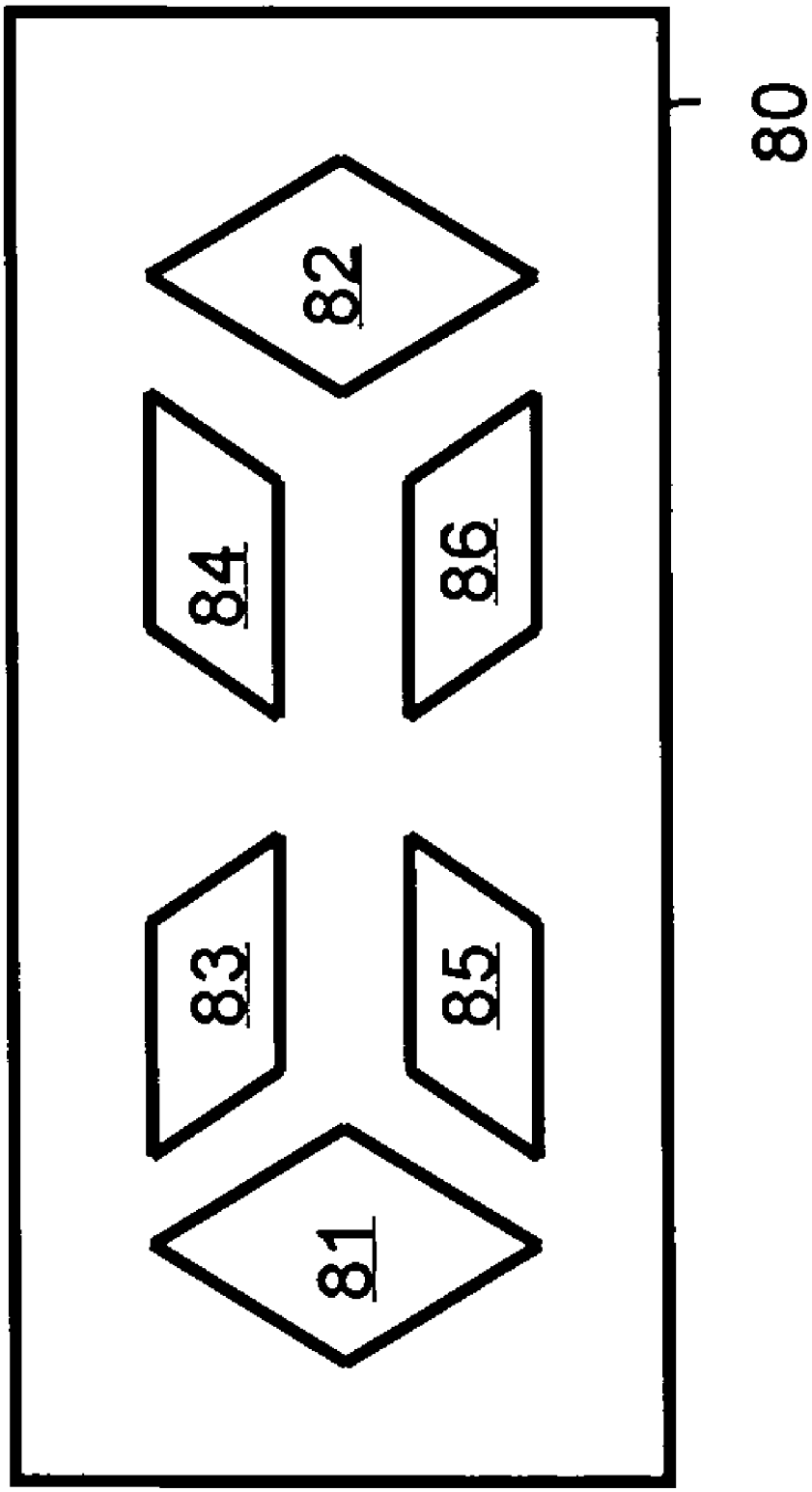
FIG. 5 shows a top view of pillars within a bubble chamber of a total internal reflection switching element in accordance with another embodiment of the present invention.

FIG. 5 shows a top view of another arrangement of pillars to form a heat conductor. The heat conductor includes a pillar 81, a pillar 82, a pillar 83, a pillar 84, a pillar 85 and a pillar 86 residing on an oxide region 80 of an integrated circuit.

In addition to use in TIRs, heat conductors can be used in other microfluidic devices that contain a single drop of fluid. For example, a pillar in the shape of a round tube can be used within a chamber in an inkjet printhead. The pillar can be used to heat the whole surface area of the chamber with heat supplied by one or more resistors at the base or at different heights along the pillar.

For example, such pillars can be used to allow precise inkjet depositions for DNA micro/nano arrays used for expression profiling. Using one or more pillars to direct heat in an inkjet tube allows reduction in the surface tension of ink allowing for smaller drops (pico to zepto liter) to be formed.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A microfluidic device used for containing a fluid drop comprising:
   a fluid container that holds the fluid drop;
   a heater against the fluid container; and,
   a heat conductor within the fluid container and attached to the fluid container at a location near the heater, the heat conductor extending vertically along walls of the fluid container, the heat conductor being more heat conductive than the fluid drop, the heat conductor being situated so as to spread heat throughout the fluid container resulting in a reduction of surface tension of the fluid drop, the heat conductor comprising an electrical conductor made of metal.

2. A device as in claim 1 wherein the heat conductor comprises a plurality of pillars.

3. A device as in claim 1 wherein the heat conductor touches the heater.

4. A device as in claim 1 wherein the heat conductor is separated from the heater by a thin oxide layer.

5. A device as in claim 1 wherein the heat conductor is at least one pillar composed of one of the following:
   metal;
   composite metal material;
   metal coated by passivating material;
   oxide coated by metal.

6. A device as in claim 1 wherein the device is an inkjet printhead.

7. A device as in claim 1 wherein the device is a total internal reflection switching element.

8. A device as in claim 1 wherein the heater comprises at least one resistor.

9. A microfluidic device used for containing a fluid drop comprising:
   a fluid container that holds the fluid drop;
   a heater against the fluid container; and,
   a ceramic heat conductor within the fluid container and attached to the fluid container at a location near the heater, the heat conductor extending vertically along walls of the fluid container, the ceramic heat conductor being more heat conductive than the fluid drop, the ceramic heat conductor being situated so as to spread heat throughout the fluid container resulting in a reduction of surface tension of the fluid drop.

10. A device as in claim 9 wherein the ceramic heat conductor comprises a plurality of pillars.

11. A device as in claim 9 wherein the ceramic heat conductor touches the heater.

12. A device as in claim 9 wherein the ceramic heat conductor is separated from the heater by a thin oxide layer.

13. A device as in claim 9 wherein the device is an inkjet printhead.

14. A device as in claim 9 wherein the device is a total internal reflection switching element.

15. A device as in claim 9 wherein the heater comprises at least one resistor.

* * * * *